(12) United States Patent
Haag

(10) Patent No.: US 8,678,746 B2
(45) Date of Patent: Mar. 25, 2014

(54) WIND TURBINE BLADE AND A PITCH CONTROLLED WIND TURBINE

(75) Inventor: Michael Drachmann Haag, Esbjerg V (DK)

(73) Assignee: Vestas Wind Systems A/S, Aarhus N (DK)

(*) Notice: Subject to any disclaimer, the term of this patent is extended or adjusted under 35 U.S.C. 154(b) by 0 days.

(21) Appl. No.: 13/438,319

(22) Filed: Apr. 3, 2012

(65) Prior Publication Data

US 2012/0189444 A1 Jul. 26, 2012

Related U.S. Application Data

(63) Continuation of application No. 12/331,224, filed on Dec. 9, 2008, now Pat. No. 8,162,590, and a continuation of application No. PCT/DK2006/000326, filed on Jun. 9, 2006.

(51) Int. Cl.
*F03D 7/02* (2006.01)

(52) U.S. Cl.
USPC .......... 415/4.3; 415/908; 416/224; 416/236 R

(58) Field of Classification Search
USPC .......... 415/4.3, 908; 416/224, 236 R, 241 R, 416/241 A
See application file for complete search history.

(56) References Cited

U.S. PATENT DOCUMENTS

| | | | |
|---|---|---|---|
| 3,578,264 A | 5/1971 | Kuethe | |
| 4,354,648 A | 10/1982 | Schenk et al. | |
| 4,584,486 A * | 4/1986 | Quynn | 290/44 |
| 4,895,491 A * | 1/1990 | Cross et al. | 416/224 |
| 5,058,837 A * | 10/1991 | Wheeler | 244/200.1 |
| 6,371,730 B1 | 4/2002 | Wobben | |
| 6,412,853 B1 * | 7/2002 | Richardson | 296/180.1 |
| 8,162,590 B2 * | 4/2012 | Haag | 415/4.3 |
| 2004/0258524 A1 | 12/2004 | Jang | |
| 2008/0175711 A1 * | 7/2008 | Godsk et al. | 416/147 |

FOREIGN PATENT DOCUMENTS

| | | |
|---|---|---|
| CL | 15862004 A1 | 4/2005 |
| DE | 10150247 A1 | 4/2003 |
| EP | 0947693 A2 | 10/1999 |
| EP | 1141543 A1 | 10/2001 |

(Continued)

OTHER PUBLICATIONS

European Patent Office, Communication of a Notice of Opposition issued in EP Application No. 06742458.0-2321 dated Sep. 20, 2012.
European Patent Office, Communication of a Notice of Opposition issued in EP Application No. 06742458.0-2321 dated Sep. 24, 2012, 26 pages.
3M, Edge Sealer ES2000, Technical Data, Oct. 2002, 2 pages.
Erich Hau, "Windkraftanlagen—Grundlagen, Technik, Einsatz, Wirtschaftlichkeit" ISBN 3-540-42827-5, Springer Verlag, 3. Auflage, 2003, Seiten 105, 112f., 258f., 5 pages.
Wetzel K K et al., "Influence of Vortex Generators on NREL S807 Airfoil Aerodynamic Characteristics and Wind Turbine Performance" Wind Engineering, Multi-Science Publishing Co., Brentwood, Essex, GB, vol. 19, No. 3, Jan. 1995, 9 pages.
Braun K A et al., "Noise Reduction by Using Serrated Trailing Edges" European Wind Energy Conference, Oct. 1997, 4 pages.
International Searching Authority, Search Report and Written Opinion issued in corresponding PCT Application No. PCT/DK2006/000326 dated Feb. 15, 2007, 12 pages. 14 pages.

*Primary Examiner* — Edward Look
*Assistant Examiner* — Aaron R Eastman
(74) *Attorney, Agent, or Firm* — Wood, Herron & Evans, L.L.P.

(57) ABSTRACT

The invention relates to a wind turbine blade comprising one or more turbulence generating strips, where the strips are placed on a surface of the blade. The blade is characterized in that at least one joint area of the turbulence generating strips and the surface of the blade are completely or partially covered by sealing means. The invention further relates to a pitch controlled wind turbine comprising at least two pitch controlled wind turbine blades and pitch controlling means for pitching the blades. The pitch controlled wind turbine is characterized in that the blades comprises one or more turbulence generating strips, wherein at least one joint area of the turbulence generating strips and a surface of the blades are completely or partially covered by sealing means.

21 Claims, 5 Drawing Sheets

(56) References Cited

FOREIGN PATENT DOCUMENTS

| | | | |
|---|---|---|---|
| EP | 2027390 A1 | 2/2009 | |
| WO | 9511388 A1 | 4/1995 | |
| WO | 97/01709 A1 | 1/1997 | |
| WO | 98/22711 A1 | 5/1998 | |
| WO | 00/15961 A1 | 3/2000 | |
| WO | WO0015961 | * | 3/2000 |
| WO | 01/16482 A1 | 3/2001 | |
| WO | WO0116482 A1 | * | 8/2001 |
| WO | 02/08600 A1 | 1/2002 | |
| WO | 2004/009723 A2 | 1/2004 | |
| WO | WO2005007722 | * | 1/2005 |

* cited by examiner

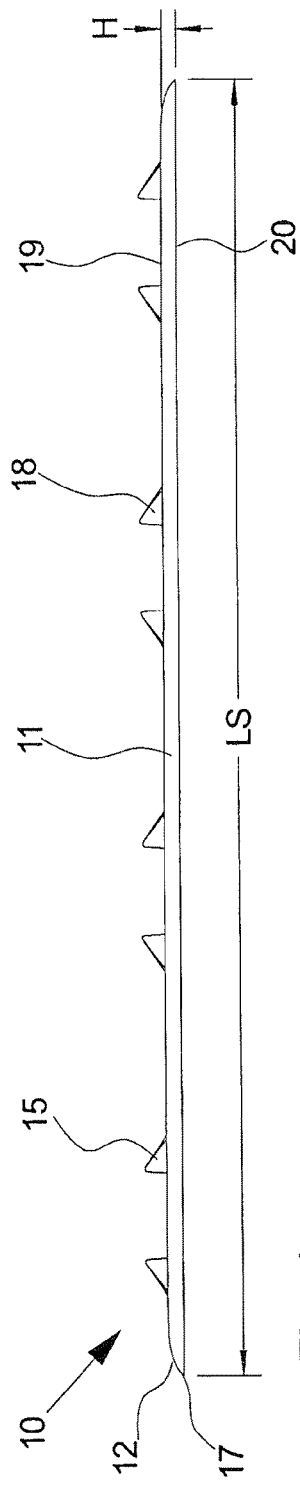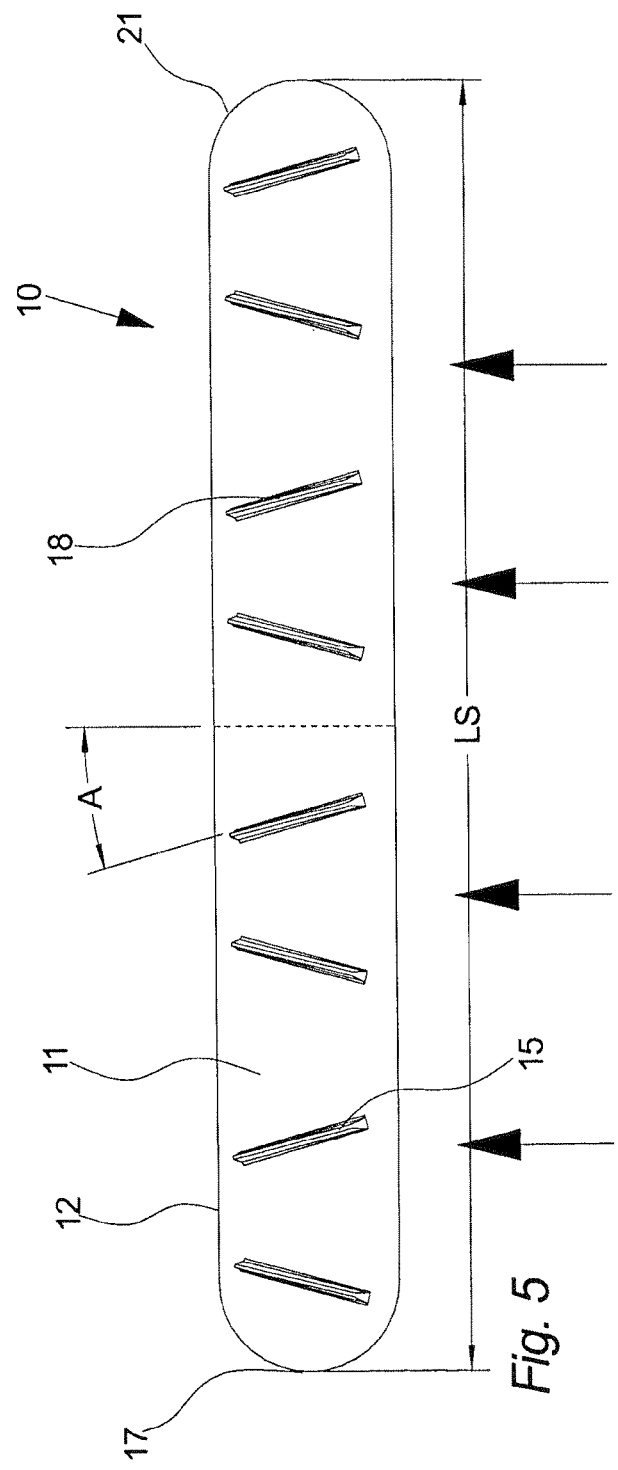

WIND TURBINE BLADE AND A PITCH CONTROLLED WIND TURBINE

CROSS-REFERENCE TO RELATED APPLICATIONS

The present application is a continuation of pending U.S. patent application Ser. No. 12/331,224 filed Dec. 9, 2008, which application is a continuation of pending International patent application PCT/DK2006/000326 filed on Jun. 9, 2006 which designates the United States. Each of these disclosures is incorporated by reference herein in its entirety.

FIELD OF THE INVENTION

The invention relates to a wind turbine blade comprising one or more turbulence generating strips, with strips being placed on a surface of the blade and attached to the surface by means of adhesive. The invention also relates to a pitch controlled wind turbine wherein one or more turbulence generating strips are placed on an outer section of the wind turbine blades in direction of the blade tip, the outer section ranging from 60% to 100% of the length of the blade, for example, the outermost third of the wind turbine blade.

BACKGROUND OF THE INVENTION

A wind turbine known in the art comprises a wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

The demands to large modern wind turbines are constantly increasing—especially regarding output. And the bigger output the wind turbine has to produce, the bigger the entire wind turbine and the different parts of the wind turbine has to be. But large modern wind turbines are already so large that it is an increasing problem to transport and erect them. It is therefore essential that the different parts of the wind turbine are made to be as efficient as possible to produce more energy without increasing the size.

Especially regarding wind turbine blades, this development has been profound. To increase the output, the blades are designed as optimal as possible regarding energy conversion of the wind and the blades are used more efficiently regarding angle of attack to the incoming wind. But the downside of this is that the blades more easily stall, or at least that the blades stall over a larger area of the blade.

One of the major consequences of stall is noise emission, and stall induced noise from the blades are almost always the main source of noise from modern wind turbines. This problem can be dealt with in different ways and one of them is disclosed in international patent WO 01/16482 where the blades of a relatively small stall controlled wind turbine are provided with vortex generators. The vortex generators create turbulence in the passing air, hereby reducing the area of the blade where stall occurs or completely eliminating stall. But wind turbines, and thereby also the wind turbine blades, are typically made to last 20 years, and in that these vortex generators are highly exposed to UV radiation, rain, snow, hail and great variations in temperatures besides being constantly drawn through the air at very high speed, the risk of the vortex generators being torn from the blade surface is very high. The vortex generators could of course just be repaired or replaced, for example, in certain intervals, but the blades are not easy to access and the downtime of large modern wind turbines are very costly.

An object of the invention is therefore to present an advantageous technique for providing a wind turbine blade with turbulence generating means.

Especially, it is an object to provide for a technique which ensures that the turbulence generating means maintains their desired function for a long time.

Furthermore, it is an object of the invention to provide for an advantageous technique for providing a wind turbine blade of a pitch controlled wind turbine with turbulence generating means.

SUMMARY OF THE INVENTION

The invention provides for a wind turbine blade comprising one or more turbulence generating strips, where the strips are placed on a surface of the blade. The blade is characterized in that at least one joint area of the turbulence generating strips and the surface of the blade are completely or partially covered by sealing means.

The outside surface of a wind turbine blade presents a very harsh environment and particularly turbulence generating strips, which are intended to stir up the airflow to some degree, are at great risk of being ripped off the blade, either simply because of the high wind speeds or because dirt, rain or other slowly works its way into the joint between the strips and the blade surface.

Providing the joint between the turbulence generating strips and the surface of the blade with a sealer is advantageous, in that it hereby is possible to prevent the wind from gripping the joint and tearing the strip off and at the same time it is possible to prevent that dirt, water or other enters the joint and degrades the strips hold on the blade. Hereby, it is ensured that the strips stay in place and maintains their function for a long time, preferably the entire lifespan of the wind turbine blade.

It should be emphasised that by the term "strip" is to be understood any kind of lengthy material, i.e., anything from a short elongated plate to a very long tape.

Furthermore, it should be emphasised that the term "joint area" is to be understood as the area at and surrounding the region at which the perimeter of the strip meets or abuts the surface of the blade. In other words, the joint area is the more or less visible gap between the strip and the blade surface and the immediate surroundings.

In an aspect of the invention, the one or more turbulence generating strips are placed on an outer section of the wind turbine blade in the direction of the blade tip.

The noise emission from a wind turbine blade increases when the rotation speed of the blade increases; and the speed of the blade, relative to the surrounding air, increases towards the tip of the blade. It is therefore advantageous to place the turbulence generating strips at an outer section of the blade in relation to noise emission.

Furthermore, the human ear is particularly sensitive to noise in a narrow frequency band. Providing the blade with turbulence generating strips near the tip of the blade broadens the frequency band at which the noise is emitted, making it less irritating to the human ear.

Even further, the turbulence generating strips may transform a part of the generated noise frequency, and when placed on the outer section of the blade, at least a part of the noise can be transformed from low frequency to high frequency. This is advantageous, in that air can much more efficiently absorb high frequency noise than low frequency noise, which thereby reduces the overall noise emission from the blade and thereby from the wind turbine on which the blade is mounted, as perceived by the human ear.

But as previously explained, the wind speed increases toward the tip of the blade hereby considerably increasing the risk of the turbulence generating strips being torn from the blade surface. It is therefore particularly advantageous to cover the joint area between the turbulence generating strips and the surface of the blade with sealing means, if the strips are placed on the outer part of the blade.

By reducing the noise emission from the blades, it could, for example, be possible to erect wind turbines closer to residential areas or to maintain normal operation of the wind turbine even at night, where it in some areas is necessary to reduce rotation speed, and thereby output, to reduce the noise emission.

In an aspect of the invention, the outer section ranges from 60% to 100% of the length of the blade, for example, the outermost third of the wind turbine blade.

The present range provides for an advantageous placement of the turbulence generating means in relation to noise emission.

In an aspect of the invention, the outer section is subdivided into two or more subsections, and the turbulence generating strips are substantially uniform within each of the subsections.

Making the turbulence generating strips uniform is advantageous production wise, in that they can be mass-produced, and thereby reducing the cost of the individual turbulence generating strips considerably. But to efficiently reduce the noise emission from the blade, it can be advantageous to vary the design or the size of the turbulence generating strips throughout the section of the blade at which they are distributed. By subdividing the outer section into two or more subsections, in which the turbulence generating strips are substantially uniform, an advantageous relation between manufacturing costs and reduction of noise emission is reached.

In an aspect of the invention, the turbulence generating strips comprise a base and wherein one or more turbulence generating means extends substantially perpendicularly from a top surface of the base.

Providing the turbulence generating strips with a base enables a large area for attaching the strips securely to the blade and making turbulence generating means extend substantially perpendicularly from a top surface of the base is advantageous, in that it hereby is possible to ensure that the turbulence generating means maintains their desired position on the blade. Furthermore, the perimeter of the base provides for a uniform and thereby advantageous position of sealing the joint area.

Furthermore, this design enables that one base can be provided with several turbulence generating means, hereby simplifying the manufacturing and mounting process when many turbulence generating means is to be attached to a blade.

In an aspect of the invention, the base has a longitudinal extent of between 10 and 4000 mm, preferably between 50 and 1000 mm, and most preferred between 100 and 500 mm.

If the strips are too short, the strips become relatively difficult and time-consuming to mount, and if they are too long, the manufacturing process becomes too expensive and the strips becomes difficult to handle during the mounting on the blade. The present length ranges therefore provide for an advantageous relation between price and ease of handling.

Furthermore, if the strips are too long, it can be difficult to apply the sealer in one flow of work, and if the strips are too short, the total length of edges that has to be sealed is drastically increased. The present length ranges therefore also provide for an advantageous relation relating to the application of the sealer.

In an aspect of the invention, the height of the base is reduced along at least a part of the edge of the base, i.e., the edge or edges is rounded, chamfered or the like.

Reducing the height of the base at the edges is advantageous, in that it hereby is possible to make an advantageous aerodynamic design, which enables that the wind is lead over the base and hereby presses the base down towards the blade. Furthermore, a rounded or chamfered edge provides for an advantageous edge regarding sealing.

In an aspect of the invention, the ends of the one or more turbulence generating strips comprise one or more rounded areas as seen in a top view.

If the turbulence generating strips had sharp corners, the strain on the strip could be concentrated in a corner hereby increasing the risk of the strip being torn from the blade. By rounding the corners or the ends of the strip, the strain is distributed more evenly.

In an aspect of the invention, the turbulence generating strips are placed in a range between 5% and 85%, preferably between 10% and 75% and most preferred between 15% and 60% of the chord length (C), from the leading edge of the wind turbine blade.

The present range provides for an advantageous placement of the turbulence generating means in relation to noise emission, but it is also approximately the area of the blade surface where the wind speed is the highest. It is therefore advantageous to seal the joint between the turbulence generating strip and the blade surface if the strip is placed in the specified area.

In an aspect of the invention, the turbulence generating strips are attached to the surface of the wind turbine blade by means of adhesive.

It is advantageous to attach the turbulence generating strips to the surface of the blade by means of adhesives such as an acryl based pressure sensitive adhesive, in that it provides for an efficient, simple and cost efficient way of attaching the strips.

Furthermore by attaching the strip by use of adhesive it is possible to attach the strip over its entire bottom surface. This is advantageous, in that this prevents the strip from flickering in the wind, which could damage a sealed joint.

In an aspect of the invention, the wind turbine blade is a pitch controlled wind turbine blade comprising at least one pitch controlling unit.

It is advantageous to provide a pitch controlled wind turbine blade with turbulence generating strips, in that it makes it possible to continuously optimise the blades angle of attack in relation to power output and noise emission.

In an aspect of the invention, the turbulence generating strips comprise vortex generators.

Using vortex generators as means for preventing or minimizing stall are well known within the art of making wind turbine blades, airplane wings and other. A lot of issues regarding production methods, attachment methods and other have therefore already been dealt with, and it is therefore advantageous to make use of these experiences in making turbulence generating strips.

Wind turbines produce noise when the blades rotate through the air. It is therefore also advantageous to provide the blades with vortex generators to function as airflow noise reduction means, even though it might increase drag and thereby decrease the wind turbines efficiency marginally.

In an aspect of the invention, the sealing means comprise a two-component polyurethane sealer.

Using sealing means in the form of a two-component polyurethane sealer, for example, based on HDI (Hexamethylene Diisocyanate) such as Edge Sealer ES2000 from the company 3M is advantageous, in that this type of sealer is particularly suited for sealing turbulence generating strips on wind turbine blades, in that it possesses the qualities of being resistant to UV radiation, of being durable, of having excellent adhering qualities against most anything and in particular against epoxy gel coat or polyurethane paint, which in most cases cover the blades and against thermoplastic polyurethane which the strips advantageously could be made of. Furthermore, this type of sealer can be made transparent, which for both practical and aesthetic reasons is advantageous.

The invention further provides for a pitch controlled wind turbine comprising at least two pitch controlled wind turbine blades and pitch controlling means for pitching the blades. The pitch controlled wind turbine is characterized in that the blades comprise one or more turbulence generating strips, wherein at least one joint area of the turbulence generating strips and a surface of the blades are completely or partially covered by sealing means.

Hereby is achieved an advantageous apparatus according to the invention.

In an aspect of the invention, the one or more turbulence generating strips are placed on an outer section of said wind turbine blades in direction of the blade tip, the outer section ranging from 60% to 100% of the length of the blade, for example, the outermost third of the wind turbine blade.

In an aspect of the invention, the wind turbine is a variable speed pitch controlled wind turbine.

Variable rotation speeds produces variable noise at variable levels which can be particularly irritating to the human ear. It is therefore advantageous to reduce the sound emission by use of turbulence generating strips on the blades of a variable speed pitch controlled wind turbine.

BRIEF DESCRIPTION OF THE DRAWINGS

The invention will be described in the following with reference to the figures in which FIG. 4 illustrates an embodiment of a turbulence generating strip as seen from the front, FIG. 5 illustrates the same embodiment of a turbulence generating strip as illustrated in FIG. 4, as seen from the top.

DETAILED DESCRIPTION OF THE INVENTION

Figure 1:
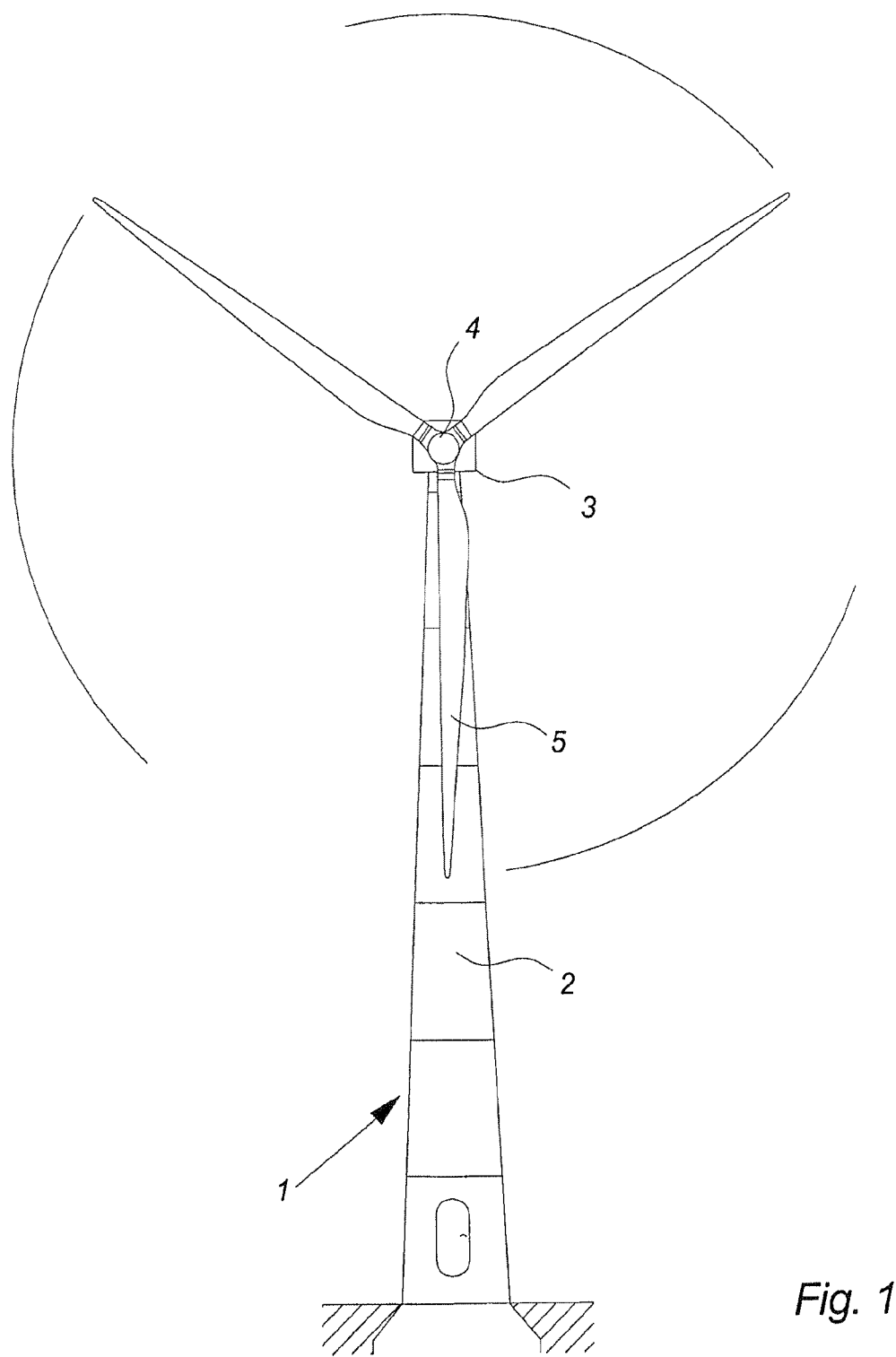
FIG. 1 illustrates a large modern wind turbine as seen from the front.

FIG. 1 illustrates a modern wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
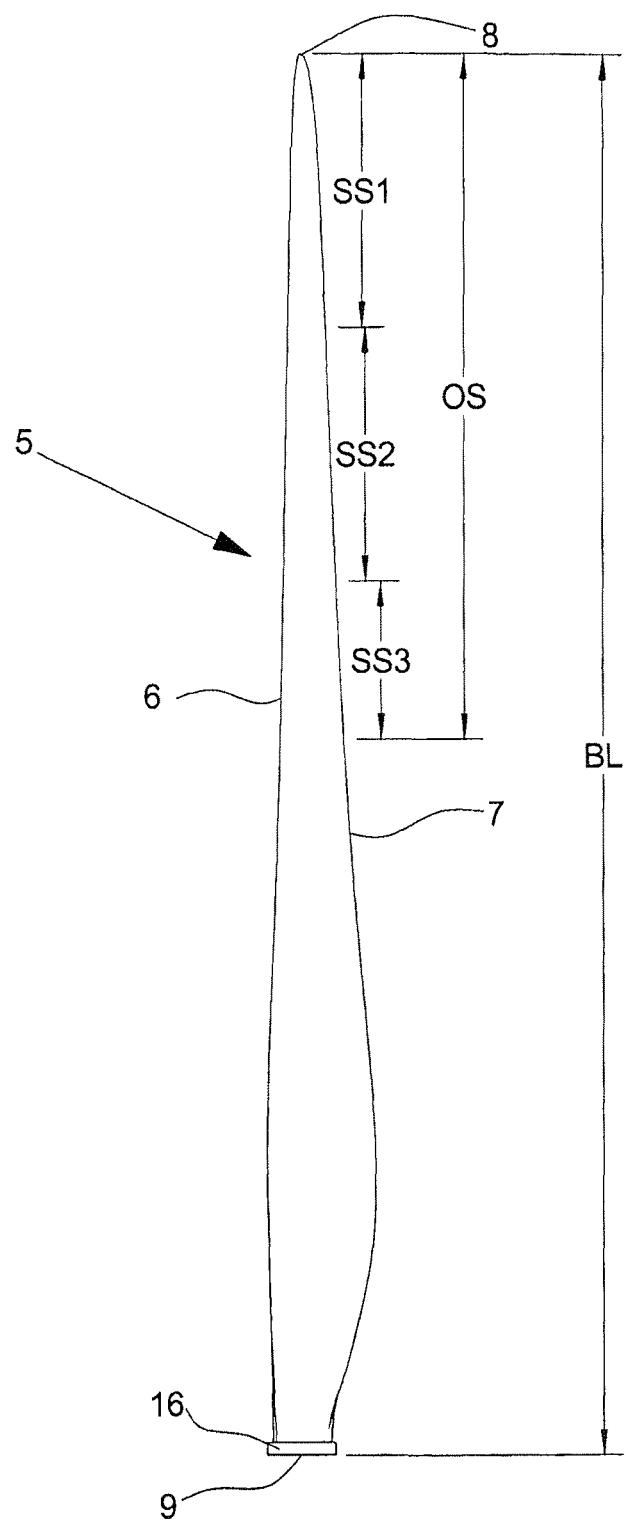
FIG. 2 illustrates a wind turbine blade, as seen from the front.

FIG. 2 illustrates a wind turbine blade 5 for a pitch controlled wind turbine 1, as seen from the front/pressure side 14. The wind turbine blade 5 comprises a leading edge 6, a trailing edge 7, a tip 8 and a root 9. A wind turbine blade 5 known in the art is typically made of a glass fibre and resin composite reinforced by carbon fibre, carbon fibre reinforced wood or a combination hereof.

The length of the blade 5 is indicated by BL.

At the root 9 the blade 5 is provided with a pitch controlling unit 16 which could comprise bearings, a gear wheel, means for pitching the blade 5 and/or means for attaching the means for pitching the blade 5.

During normal operation of a wind turbine 1, the blades 5 are rotated relative to the rotor plane. The incoming wind is about orthogonal to the rotor plane, but since the blades 5 are in motion, the effective angle and speed of the incoming wind (i.e. corresponding to steady blades) depends on the rotation speed of the blade 5. The effective angle is usually referred to as the angle of attack.

Ideally, the angle of attack would be around 3° to 8°, but when the wind speeds become too high, the blades 5 are pitched out of the wind to protect the wind turbine 1.

OS indicates the outer section of the blade 5 in this embodiment of the invention, and the outer section OS is in this embodiment further subdivided into subsections 1, 2 and 3 SS1, SS2, SS3. In another embodiment of the invention, the outer section OS could be subdivided into another number of subsections, for example, two or four subsections of identical or varying length. The outer section OS constitutes approximately 40% of the blade length BL in this embodiment of the invention, i.e., it extends from approximately 60% of the blade length BL to 100% of the blade length BL, as measured from the root 9.

The turbulence generating strips 10, which will be described in more detail under FIGS. 4 and 5, are in this embodiment of the invention positioned in the outer section OS in even intervals, but in another embodiment of the invention the turbulence generating strips 10 could be positioned with varying distances between adjacent strips 10. In another embodiment of the invention, the turbulence generating means 10 could also be positioned in more than one row, for example, two or three rows. In a preferred embodiment of the invention, the most outer half meter of the blade 5, i.e., the last half meter of the blade 5 closest to the tip 8 would not be provided with turbulence generating strips 10.

In this embodiment of the invention, the turbulence generating strips 10 placed in subsection 1 SS1 are substantially uniform and the turbulence generating means 18 on the strips 10 are smaller than the turbulence generating means 18 on the strips 10 placed in subsection 2 SS2, which again are smaller than the turbulence generating means 18 on the strips 10 placed in subsection 3 SS3. In a preferred embodiment, the size of the turbulence generating means 18 would depend of the chord length C of the blade 5 making substantially all the turbulence generating means 18 of varying size, but because this would make the turbulence generating means 18 relatively expensive and difficult to manufacture and mount, the strips 10 within each subsection SS1, SS2, SS3 are substantially identical but different from the strips 10 in the other subsections SS1, SS2, SS3.

Figure 3:
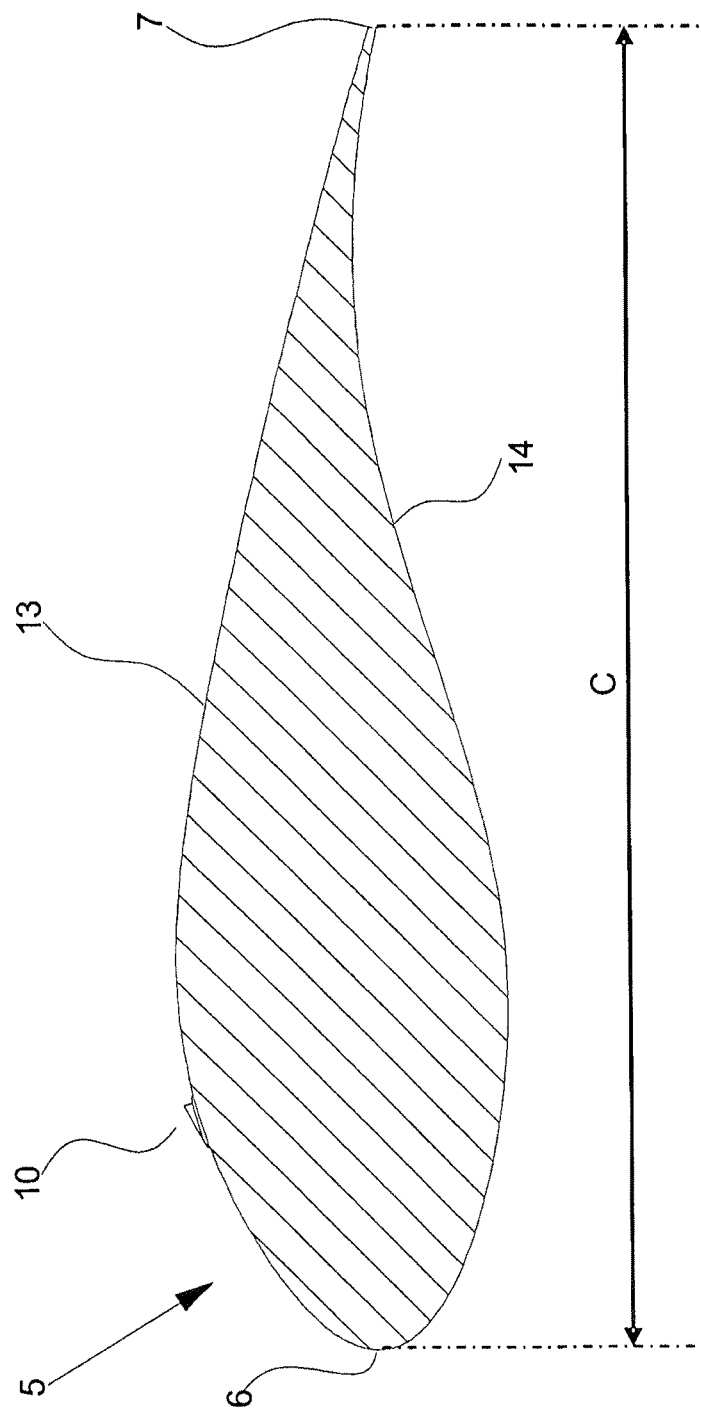
FIG. 3 illustrates a cross-section of a wind turbine blade, as seen from the root of the blade.

FIG. 3 illustrates a cross-section of a wind turbine blade 5, as seen from the root 9 of the blade 5. The blade 5 comprises a suction/leeward side 13, a pressure side 14, a leading edge 6 and a trailing edge 7. The chord length of the blade 5 is illustrated as C and is the distance between the leading edge 6 and the trailing edge 7.

In this embodiment of the invention, a turbulence generating strip 10 is placed on the leeward side 13 of the blade 5 approximately 20% of the chord length C from the leading edge 6.

In this embodiment of the invention, the turbulence generating strips 10 are positioned on the blade 5 in a straight line, but in another embodiment of the invention they could be positioned within a fixed or varying range from the leading edge 6 or the trailing edge 7 of the blade 5.

FIG. 4 illustrates an embodiment of a turbulence generating strip 10 as seen from the front. In this embodiment, the turbulence generating strip 10 comprises turbulence generating means 18 in the form of eight fins 15 extending substantially perpendicular from a top surface 19 of a base 11. In another embodiment, the strip 10 could comprise another number of fins 15 or each strip 10 could comprise only one or two fins 15 per individual base 11.

If the strip 10, or at least the base 11, is made of a relatively inflexible material, the base 11 could during its production be made to fit the shape of the surface of the blade 5 where it is to be attached. Hereby, the strip 10 will not be provided with unnecessary internal stress as it would be if it had to be forced to fit the surface.

The bottom surface 20 of the base 11 can be attached to the surface of a wind turbine blade 5 by means of screws, bolts, rivets, welding or other suitable attachment means, but in a preferred embodiment of the invention, the strip 10 is attached to the surface of the blade 5 by use of adhesive means, for example, in the form of an adhesive film applied to the bottom surface 20 of the entire base 11 or to parts of the bottom surface 20, which then would be covered by a peel-off strip (not shown) to protect the adhesive film and maintain its adhesive qualities until the strip 10 is to be attached on the blade 5. The adhesive film would in a preferred embodiment of the invention be an acryl based Pressure Sensitive Adhesive (PSA). Acryl based adhesives are known for their excellent power of resistance to moisture, UV radiation and cyclic temperatures making these types of adhesives very durable even on wind turbine blades 5.

Arranging the adhesive as a film is advantageous over a liquid adhesive, in that a film generates adhesion immediately on contact with the surface of the blade 5. No additional fixating device is therefore needed.

In this embodiment of the invention, the fins 15 are formed integrally with the base 11, for example, by being shaped in a mould during an injection moulding process but in another embodiment the fins 15 could be individual plates attached to the top surface 19 the base 11 by use of adhesive means, welding, screws, bolts or other.

The entire turbulence generating strip 10 is preferably made of Thermoplastic Polyether-Polyurethane (TPU), but in another embodiment the strip 10 could also be made from Polybutylene Terephthalate (PBT), Polyethylene Terephthalat (PET), Polyethylene (LDPE), wood, metal such as aluminum or stainless steel, another type of plastic or the same type of material as the blade 5 is made of or any other material suitable for making turbulence generating strips 10 or the strip 10 could be made from a combination of different materials, for example, TPU covering a metal template or metal fins 15 extending from a TPU base 11.

The turbulence generating strips 10 could be made transparent for esthetic reasons, but to improve the materials weathering properties different additives can be added to the TPU. Carbon Black can be added to function as a UV absorber, but since this will color the strips 10 black, which for esthetic reasons are unwanted, the TPU material is in this embodiment colored gray and added UV-stabilizers in form of Hindered Amine Light Stabilizers (HALS). In another embodiment of the invention, the material could be in another color or the strip 10 could be painted before or after it has been mounted on the blade 5.

FIG. 5 illustrates the same embodiment of a turbulence generating strip 10 as illustrated in FIG. 4, as seen from the top. In this embodiment, the base 11 of the strip 10 comprises rounded areas 21 at the ends 17 of the strip 10, in that the ends 17 are formed as semicircles. In another embodiment, the ends 17 could comprise rounded areas 21 in another way, for example, if one or more of the corners was more or less rounded or if only the two corners facing the wind where rounded.

In this embodiment, the strip 10 has a longitudinal extent LS of approximately 217 mm but in another embodiment the strip 10 could have a length LS of between 10 and 4000 mm, preferably between 50 and 1000 mm and most preferred between 100 and 500 mm, or the strip 10 could be formed as a base 11 comprising only one or two turbulence generating means 18 making the longitudinal extent LS of the strip 10 very little.

In this embodiment, the strip 10 is substantially straight in its longitudinal extent LS, but in another embodiment the strip 10 could be curved, zigzag shaped or other.

The arrows in front of the turbulence generating strip 10 illustrates the airflow direction during normal operation, when the turbulence generating strip 10 is mounted on a wind turbine blade 5. As illustrated by the angle A, the turbulence generating means 18 are positioned in an angle of approximately 16° and −16° relative to the airflow direction. In another embodiment of the invention, the fins 15 could be positioned in another angle relative to the airflow direction or the fins 15 could be parallel with the airflow direction.

In this embodiment of the invention, the turbulence generating means 18 are all of the same size and design as seen from the top, but in another embodiment, both the size and the design could vary throughout the length LS of the strip 10.

Figure 6:
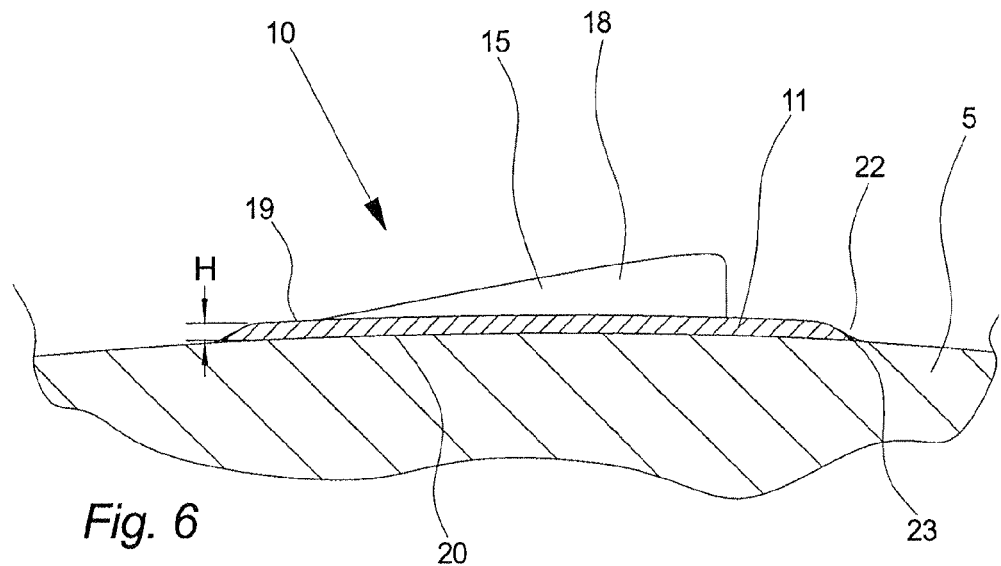
FIG. 6 illustrates a part of a cross-section of a wind turbine blade comprising a turbulence generating strip, as seen from the root of the blade.

FIG. 6 illustrates a part of a cross-section of a wind turbine blade 5 comprising a turbulence generating strip 10, as seen from the root of the blade 5.

In this embodiment of the invention, the fins 15 of the turbulence generating mean 10 are triangular, making the fins 15 highest at the back. In another embodiment of the invention, the fins 15 could be shaped as a part of a circle or a cone, as a shark fin, rectangular or any other shape suitable for generating turbulence.

As shown, the surface of the blade 5 is slightly curving where the strip 10 is mounted. The strip 10 is therefore manufactured with this curve inherited to ensure that the edges 12 of the base 11 are abutting the surface of the blade 5.

In this embodiment, the edges 12 of the strip 10 are rounded or at least the height H of the base 11 is reduced toward the edges 12 on both sides of the strip 10, but in another embodiment, only the edge 12 facing the wind would be rounded.

The joint area 22 all the way along the entire perimeter of the base 11 is in this embodiment provided with sealing means 23 in the form of a sealer which smoothes out the transition between the strip 10 and the blade, making it more aerodynamically advantageous and protecting the gap from ingress of water or dirt. Furthermore, if the entire perimeter of the base 11 is sealed, it is possible to ensure that the adhesive attaching the bottom surface 20 of the base 11 to the surface of the blade 5 is completely protected from interacting with the surroundings, hereby prolonging the life of the adhesive means.

In another embodiment of the invention, only the edge 12 facing the wind could be sealed.

Figure 7:
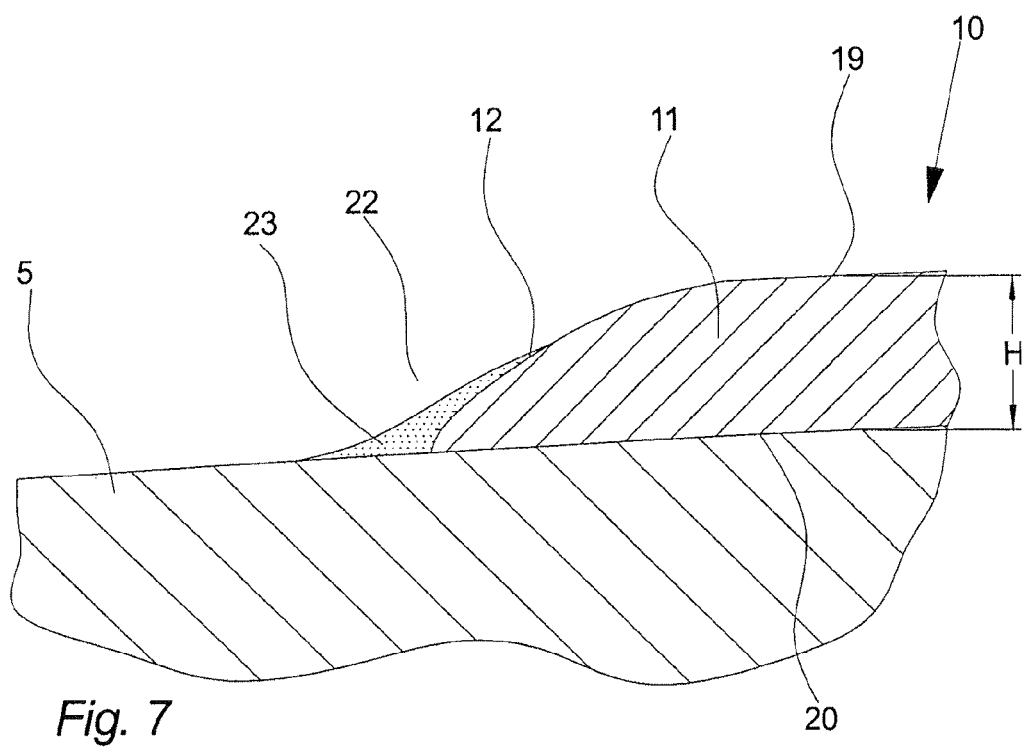
FIG. 7 illustrates a close-up of a joint area of a strip and a blade surface, as seen from the root of the blade.

FIG. 7 illustrates a close-up of a joint area 22 of a strip 10 and a blade surface, as seen from the root of the blade 5.

In this embodiment of the invention, the thickness of the layer of sealer 23 is not constant as seen in cross-section. The figure shows that the layer of sealer 23 is thickest immediately over the joint and then becomes thinner and thinner toward both sides. Hereby is created a smooth transition between the surface of the blade 5 and the edge 12 of the strip 10, ensuring that the wind cannot tear the strip 10 off the blade 5.

In this embodiment of the invention, the sealer 23 is a two-component polyurethane based on HDI (Hexamethylene Diisocyanate) in the form of the product: Edge Sealer ES2000 from the company 3M, but in another embodiment, the sealer 23 could also be made from one-component polyurethanes, silicones, acrylic, MS polymer or other materials or compounds as long as the sealer 23 possesses the qualities of being durable in the environment in which it is to be used, and as long as it is easy to apply and relatively inexpensive. Furthermore, the sealer 23 would have to be relatively quick-drying to ensure an efficient application of the sealer. For example, Edge Sealer ES2000 becomes so dry that the free surface substantially does not adhere after approximately one and a half (1.5) hours at 20'Celsius, which is a very appropriate amount of time, in that if the sealer 23 dries too fast, it can be difficult to apply satisfactory, and if it dries too slow, it can increase the manufacturing and application time.

The invention has been exemplified above with reference to specific examples of wind turbine blades 5, turbulence generating strips 10 and sealing means 23. However, it should be understood that the invention is not limited to the particular examples described above but may be designed and altered in a multitude of varieties within the scope of the invention as specified in the claims.

What is claimed is:

1. A wind turbine blade comprising:
   one or more turbulence generating strips, said strips each including a base being placed on a surface of said blade and attached to said surface by adhesive and one or more turbulence generators extending from the base,
   wherein at least one joint area of said turbulence generating strips and said surface of said blade is completely covered by a sealant, such that the sealant completely isolates the adhesive from environmental conditions including moisture and UV radiation,
   wherein the sealant includes a first portion overlying the surface of the wind turbine blade and a second portion overlying an edge of the base, the sealant having a maximum thickness at the at least one joint area and decreasing in thickness along the first and second portions of the sealant so that there is a smooth transition between the surface of the wind turbine blade and the base, and
   wherein the edge of the base defines a rounded portion adjacent to a maximum height of the base, and wherein the sealant covers only a portion of the rounded portion such that the sealant remains spaced from the maximum height of the base.

2. A wind turbine blade according to claim 1, wherein a height of said base is reduced along at least a part of an edge of said base such that the edge is rounded or chamfered.

3. A pitch controlled wind turbine comprising:
   at least two pitch controlled wind turbine blades and
   a pitch controlling mechanism for pitching said blades wherein said blades comprise one or more turbulence generating strips, each of the one or more turbulence generating strips including a base attached to a surface of the wind turbine blade and one or more turbulence generators extending from the base, the base further including an edge defining a periphery of the base and a joint area at which the periphery of the base meets the surface of the wind turbine blade,
   wherein at least one joint area of said turbulence generating strips and said surface of said blades is completely or partially covered by a sealant, and
   wherein the edge of the base is rounded at a rounded portion such that a maximum height of the base is spaced from the joint area, and the sealant covers only a portion of the rounded portion such that the sealant remains spaced from the maximum height of the base.

4. A pitch controlled wind turbine according to claim 3, wherein said one or more turbulence generating strips are placed on an outer section of said wind turbine blades in direction of the blade tip, said outer section ranging from 60% to 100% of the length of said blade.

5. A pitch controlled wind turbine according to claim 3, wherein said wind turbine is a variable speed pitch controlled wind turbine.

6. A wind turbine blade comprising:
   one or more turbulence generating strips, each of the one or more turbulence generating strips including a base attached to a surface of the wind turbine blade and one or more turbulence generators extending from the base, the base further including an edge defining a periphery of the base and a joint area at which the periphery of the base meets the surface of the wind turbine blade,
   wherein at least a portion of the joint area is covered by a sealant, and
   wherein the edge of the base is rounded at a rounded portion such that a maximum height of the base is spaced from the joint area, and the sealant covers only a portion of the rounded portion such that the sealant remains spaced from the maximum height of the base.

7. A wind turbine blade according to claim 6, wherein said one or more turbulence generating strips are placed on an outer section of said wind turbine blade in direction of the blade tip.

8. A wind turbine blade according to claim 7, wherein said outer section ranges from 60% to 100% of the length of said blade.

9. A wind turbine blade according to claim 7, wherein said outer section is subdivided into two or more subsections, and said turbulence generating strips are substantially uniform within each of said subsections.

10. A wind turbine blade according to claim 6, wherein said base has a longitudinal extent of between 10 and 4000 mm.

11. A wind turbine blade according to claim 10, wherein said base has a longitudinal extent of between 50 and 1000 mm.

12. A wind turbine blade according to claim 11, wherein said base has a longitudinal extent of between 100 and 500 mm.

13. A wind turbine blade according to claim 6, wherein ends of said one or more turbulence generating strips comprise one or more rounded areas as seen in a top view.

14. A wind turbine blade according to claim 6, wherein said turbulence generating strips are placed in a range between 5% and 85% of a chord length, from a leading edge of said wind turbine blade.

15. A wind turbine blade according to claim 14, wherein said turbulence generating strips are placed in a range between 10% and 75% of the chord length, from the leading edge of said wind turbine blade.

16. A wind turbine blade according to claim 15, wherein said turbulence generating strips are placed in a range between 15% and 60% of the chord length, from the leading edge of said wind turbine blade.

17. A wind turbine blade according to claim 6, wherein said wind turbine blade is a pitch controlled wind turbine blade comprising at least one pitch controlling unit.

18. A wind turbine blade according to claim 6, wherein said turbulence generating strips comprise vortex generators.

19. A wind turbine blade according to claim 6, wherein said sealant comprises a two-component polyurethane sealer.

20. A wind turbine blade comprising:
one or more turbulence generating strips, each of the one or more turbulence generating strips including a base attached to a surface of the wind turbine blade and one or more turbulence generators extending from the base, the base further including an edge defining a periphery of the base and a joint area at which the periphery of the base meets the surface of the wind turbine blade,
wherein each of the one or more turbulence generating strips is attached to the surface of the wind turbine blade by a film adhesive at the base, such that no additional fixating device is used with the film adhesive,
wherein the entire periphery of the base is covered by a sealant at the joint area, such that the sealant completely isolates the adhesive from environmental conditions including moisture and UV radiation,
wherein the sealant includes a first portion overlying the surface of the wind turbine blade and a second portion overlying the edge of the base, the sealant having a maximum thickness at the joint area and decreasing in thickness along the first and second portions of the sealant so that there is a smooth transition between the surface of the wind turbine blade and the base, and
wherein the edge of the base defines a rounded portion adjacent to a maximum height of the base, and wherein the sealant covers only a portion of the rounded portion such that the sealant remains spaced from the maximum height of the base.

21. A wind turbine blade comprising:
one or more turbulence generating strips, each of the one or more turbulence generating strips including a base attached to a surface of the wind turbine blade and one or more turbulence generators extending from the base, the base further including an edge defining a periphery of the base and a joint area at which the periphery of the base meets the surface of the wind turbine blade, wherein the edge of the base is rounded or chamfered such that a maximum height of the base is spaced from the joint area,
wherein at least a portion of the joint area is covered by a sealant, the sealant including a first portion overlying the surface of the wind turbine blade and a second portion overlying the edge of the base, the sealant having a maximum thickness at the joint area and decreasing in thickness along the first and second portions of the sealant so that there is a smooth transition between the surface of the wind turbine blade and the base; and,
wherein the edge of the base defines a rounded portion adjacent to the maximum height of the base, and wherein the sealant covers only a portion of the rounded portion such that the sealant remains spaced from the maximum height of the base.

* * * * *